(12) United States Patent
Cervantes (10) Patent No.: US 7,042,484 B2
(45) Date of Patent: May 9, 2006

(54) SCAN LINE LENGTH ADJUSTMENT (75) Inventor: Jose L Cervantes, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 45 days.

(21) Appl. No.: 10/393,155

(22) Filed: Mar. 20, 2003

(65) Prior Publication Data
US 2004/0183892 A1   Sep. 23, 2004

(51) Int. Cl.
B41J 2/47 (2006.01)

(52) U.S. Cl. ...................................... 347/239; 347/255

(58) Field of Classification Search ................ 347/234, 347/235, 239–240, 248, 249, 250, 251–254, 347/128–132, 144, 142, 237, 247, 255, 135, 347/256, 196; 341/101; 382/276; 358/3.02; 332/109
See application file for complete search history.

(56) References Cited

U.S. PATENT DOCUMENTS

| 4,852,957 | A | | 8/1989 | Wakimoto et al. ........... 359/208 |
| 4,870,499 | A | * | 9/1989 | Suzuki et al. ............... 358/3.02 |
| 5,023,615 | A | | 6/1991 | Yamada et al. .............. 341/152 |
| 5,065,441 | A | * | 11/1991 | Yamamoto et al. .......... 382/276 |
| 5,193,008 | A | | 3/1993 | Frazier et al. ............... 358/1.2 |
| 5,436,644 | A | * | 7/1995 | Motoi et al. ................. 347/256 |
| 5,444,728 | A | | 8/1995 | Thompson ................ 372/38.02 |
| 5,629,696 | A | * | 5/1997 | Kawasaki et al. ........... 341/101 |
| 5,666,447 | A | | 9/1997 | Chuang et al. ................ 385/31 |
| 5,691,759 | A | | 11/1997 | Hanson ........................ 347/233 |
| 5,760,817 | A | | 6/1998 | Foote et al. ................. 347/248 |
| 5,764,664 | A | | 6/1998 | Yip et al. ...................... 372/26 |
| 5,818,504 | A | | 10/1998 | Chung et al. ................ 347/251 |
| 6,037,962 | A | | 3/2000 | Hanson et al. .............. 347/233 |
| 6,057,867 | A | | 5/2000 | Chan et al. .................. 347/134 |
| 6,134,041 | A | | 10/2000 | Hong et al. .................. 359/216 |
| 6,201,560 | B1 | | 3/2001 | Curry .......................... 347/240 |
| 6,362,847 | B1 | * | 3/2002 | Pawley et al. ............... 347/234 |
| 6,366,307 | B1 | | 4/2002 | Morrison ..................... 347/249 |
| 6,390,579 | B1 | | 5/2002 | Roylance et al. ............... 347/9 |

FOREIGN PATENT DOCUMENTS

EP           1030265 A2 *   8/2000

* cited by examiner

Primary Examiner—Hai Pham (57) ABSTRACT

In one embodiment, the present invention provides a scan line controller for use with a laser scanning device. The scan line controller includes a pulse width modulator system to receive a pulse code, including a first pulse width modulator to receive a first dot clock and a second pulse width modulator to receive a second dot clock, and to provide a video driver signal to a laser unit to provide a scan line from the video driver signal. The scan line controller further includes a space insertion/deletion unit configured to adjust a scan line length by inserting or deleting one or more delays into the first and the second dot clocks.

51 Claims, 6 Drawing Sheets

SCAN LINE LENGTH ADJUSTMENT

BACKGROUND

Laser printers are designed to produce an image on paper or other print material by placing overlapping dots at virtual positions defined by a digital raster. These virtual positions in the raster are known as "pixels", short for "picture elements". In laser printers, the image is typically first produced on a charged photoconductive material by scanning the photoconductor with a laser beam in a sequence of scan lines. As a line is scanned, or written, the laser beam is energized during the extent of each pixel that corresponds to a dot in the image. When the laser beam is energized, it discharges the portion of the photoconductor upon which the laser energy impinges. The sequential scanning by the laser produces a charge-pattern copy of the desired image on the photoconductor. The printed output is obtained by developing the charge pattern by attracting toner to it and transferring the developed image to paper or other print material.

Color laser printers use four laser-photoconductor developer systems to simultaneously expose, develop, and print four different color planes (e.g., cyan, yellow, magenta, and black, or "CYMK") to produce a colored print. These types of color printers are known as "in-line" color printers. For an in-line printer to produce a high quality image, proper alignment must be maintained between the scan lines of each of the four color planes. Improperly aligned color planes degrade print quality by producing visual artifacts such as fringing of colors and poorly defined edges, similar to a poorly adjusted color TV or a badly printed copy of color newspaper comics. However, due to the cumulative affects of varying mechanical tolerances between the four separate laser/photoconductor units, each of the four color planes almost inevitably varies slightly from the other three. A slight divergence between the four color planes will almost certainly reduce print quality by producing a color "halo" somewhere in the print image.

Generally, imaging hardware on a laser scanning device provides a pixel data stream at a laser writing frequency to a laser driver that converts the pixel data stream to a laser control signal which, in-turn, is converted by a laser unit into a laser beam that is scanned along a scan line. Attempts to improve the alignment between the four color planes can potentially cause instability in pulse width modulator (PWM) type laser drivers. This instability can last for several cycles while the PWM recovers and returns to stable operation. Consequently, during a recovery period a PWM may provide a distorted output signal which can result in a corresponding distortion in an image produced by a laser unit on a print material.

SUMMARY OF THE INVENTION

In one embodiment, the present invention provides a scan line controller for use with a laser scanning device. The scan line controller includes a pulse width modulator system to receive a pulse code, including a first pulse width modulator to receive a first dot clock and a second pulse width modulator to receive a second dot clock, and to provide a video driver signal to a laser unit to provide a scan line from the video driver signal. The scan line controller further includes a space insertion/deletion unit configured to adjust a scan line length by inserting or deleting one or more delays into the first and the second dot clocks.

DESCRIPTION OF THE PREFERRED EMBODIMENTS

Figure 1:
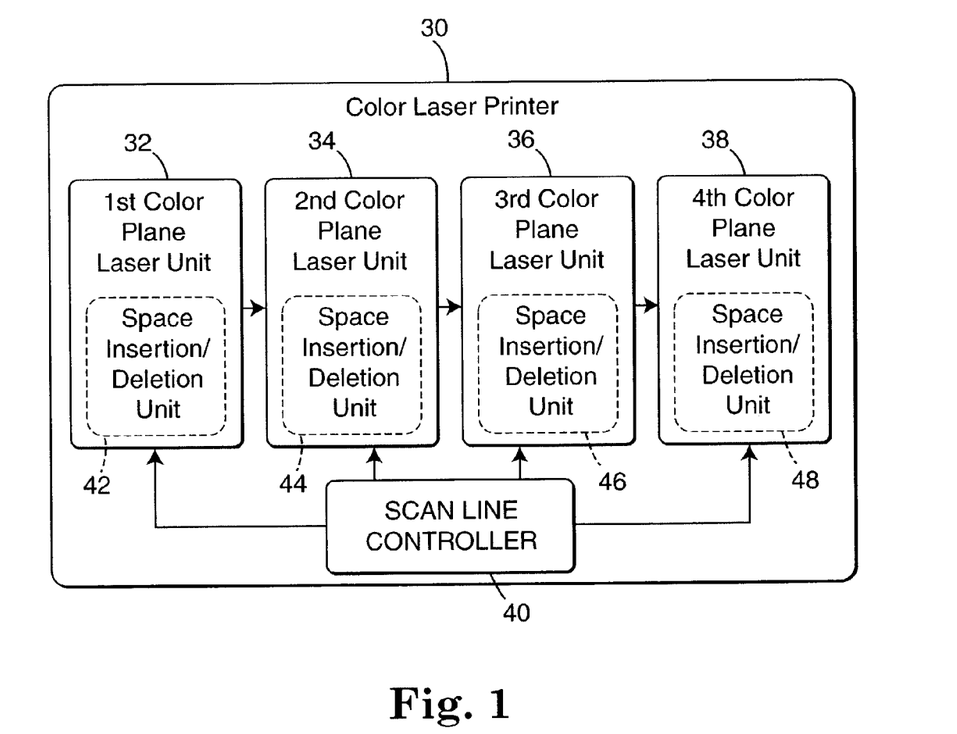
FIG. 1 is a block diagram of one exemplary embodiment of an in-line color laser printer.

FIG. 1 illustrates in block diagram form one exemplary embodiment of an in-line color laser printer 30. Laser printer 30 includes four laser units 32, 34, 36, and 38, and a scan line controller 40. Each laser unit 32, 34, 36, and 38 produces an image in one of four color planes (e.g., cyan, yellow, magenta, and black, or "CYMK"). Each image comprises a series of dot patterns written along a sequence of scan lines, with each scan line having a length. Laser printer 30 simultaneously exposes and develops the four CYMK color planes to produce a colored image on a print material. Scan line controller 40 selectively inserts or deletes delays into the dot patterns provided by each of the four laser units 32, 34, 36, and 38 to adjust the scan line lengths to thereby maintain substantial alignment between the four CYMK color planes and provide improved image quality. Scan line controller 40 is capable of adjusting the scan line lengths of laser units employing pulse width modulator (PWM) type laser drivers without creating a significant amount of distortion in the associated images. In an alternate embodiment, each laser unit 32, 34, 36, and 38 may include its own scan line controller, as indicated by dashed boxes 42, 44, 46, and 48.

Figure 2A:
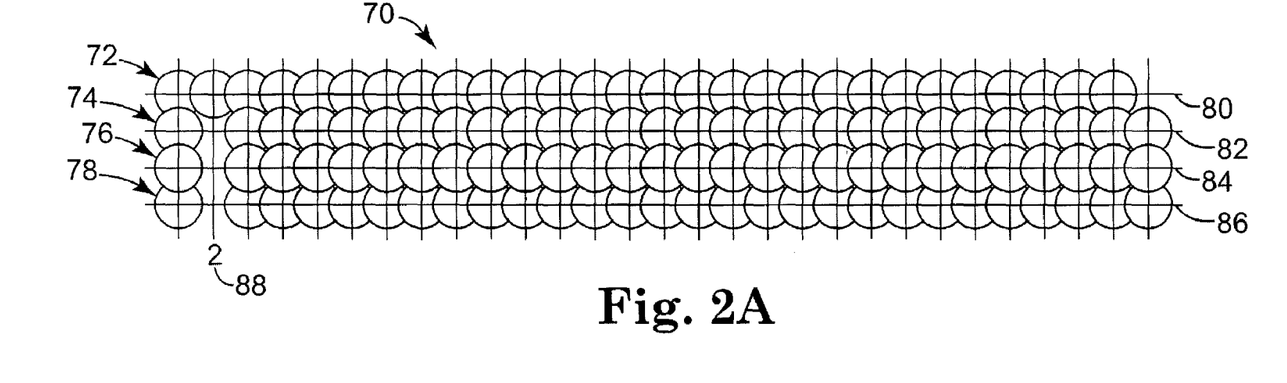
FIG. 2A is an illustrative diagram of an example dot pattern provided by a laser printer with a one dot-width delay inserted.
Figure 2B:
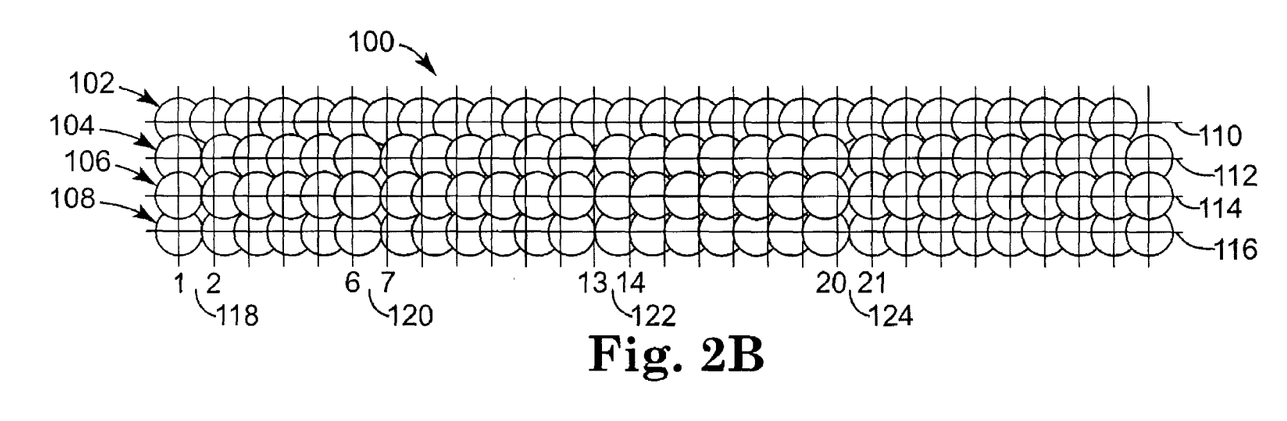
FIG. 2B is an illustrative diagram of an example dot pattern provided by a laser printer with a one dot-width delay inserted.
Figure 2C:
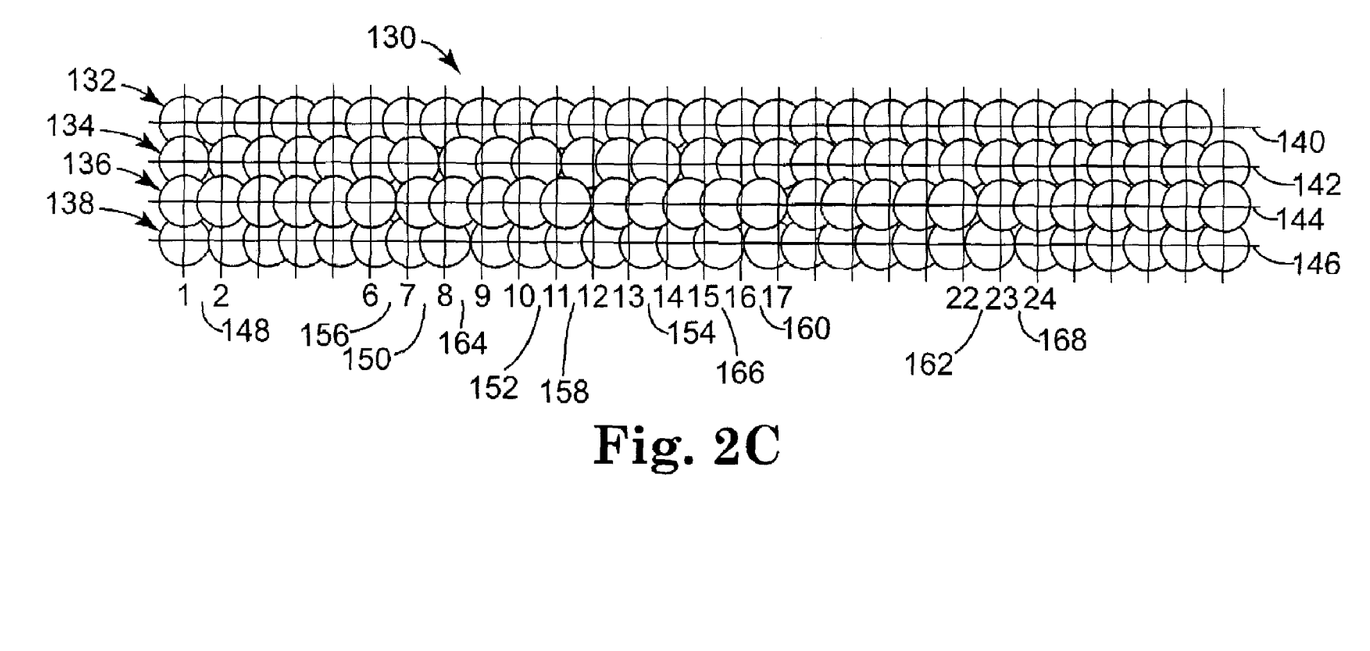
FIG. 2C is an illustrative diagram of an example dot pattern provided by a laser printer with a one dot-width delay inserted.

FIGS. 2A, 2B, and 2C each illustrate a potential scenario of scan line controller inserting a single dot width delay into an example dot pattern produced by laser units 32, 34, 36, and 38. In each of the FIGS. 2A, 2B, and 2C, scan line controller 40 determines which laser unit is providing the longest scan line and inserts a small delay into the dot patterns provided by the three remaining laser units to lengthen their scan lines to match the longest scan line. Also, in each of the FIGS. 2A, 2B, and 2C, a first row illustrates a dot pattern along a scan line that is 28 dots long, while the remaining three rows illustrate a dot pattern comprising 28 dots that has been lengthened to provide a scan line 29 dots long. For purposes of discussion, FIGS. 2A, 2B, and 2C illustrate only the insertion of a delay into a dot pattern. Deletion of delays, however, follows essentially the same principals, but results in a squeezing of the dot patterns rather than an expansion.

FIG. 2A illustrates a first scenario of inserting delays into an example printed output 70. Printed output 70 has four rows of dot patterns 72, 74, 76, and 78 printed along scan lines 80, 82, 84, and 86, respectively. Dot pattern 72 comprises 28 dots along scan line 80 which has a length of 28 dots. Dot patterns 74, 76, and 78 also comprise 28 dots, but in addition each have a single dot width delay inserted at column two, indicated at 88, to increase the lengths scan lines 82, 84, and 86 to a length of 29 dots. While this scenario lengthens the scan lines, this scenario introduces a noticeable gap at column two, resulting in a visible artifact in printed output 70.

FIG. 2B illustrates a second scenario of inserting delays into an example printed output 100. Printed output 100 has four rows of dot patterns, 102, 104, 106 and 108 printed along scan lines 110, 112, 114, and 116, respectively. Dot pattern 102 comprises 28 dots printed along scan line 110 which has a length of 28 dots. Dot patterns 104, 106, and 108 also comprise 28 dots, but in addition each includes four one-quarter dot width delays to increase the lengths of scan lines 112, 114, and 116 to a length of 29 dots. The one-quarter dot width delays are inserted between columns 1 and 2, indicated at 118, between columns 6 and 7, indicated at 120, between columns 13 and 14, indicated at 122, and between columns 20 and 21, as indicated at 124. While the inserted delays are still visible, the gaps are less noticeable than the whole dot scenario of FIG. 2A.

FIG. 2C illustrates a third scenario of inserting delays into an example printed output 130. Printed output 130 has four rows of dot patterns, 132, 134, 136, and 138 printed along scan lines 140, 142, 144, and 146, respectively. Dot pattern 132 comprises 28 dots printed along scan line 140 which has a length of 28 dots. Dot patterns 134, 136, and 138 also comprise 28 dots, but in addition each includes four one-quarter dot width delays inserted randomly over the length of the scan lines to increase the length of scan lines 142, 144, and 146 to a length of 29 dots. The one-quarter dot width delays in scan line 142 are inserted between columns 1 and 2, indicated at 148, between columns 7 and 8, indicated at 150, between columns 10 and 11, indicated at 152, and between columns 13 and 14, indicated at 154. The one-quarter dot width delays in scan line 144 are inserted between columns 6 and 7, indicated at 156, between columns 11 and 12, indicated at 158, between columns 16 and 17, indicated at 160, and between columns 22 and 23, indicated at 162. The one-quarter dot width delays in scan line 146 are inserted between columns 1 and 2, indicated at 148, between columns 8 and 9, indicated at 164, between columns 15 and 16, indicated at 166, and between columns 23 and 24, indicated at 168. Because the gaps are randomly distributed from row to row, gaps in one row will not typically abut gaps in a neighboring row. Thus, the random insertion of delays according to this scenario is the most effective of the three scenarios described above at reducing visual artifacts created by the delays.

Figure 3:
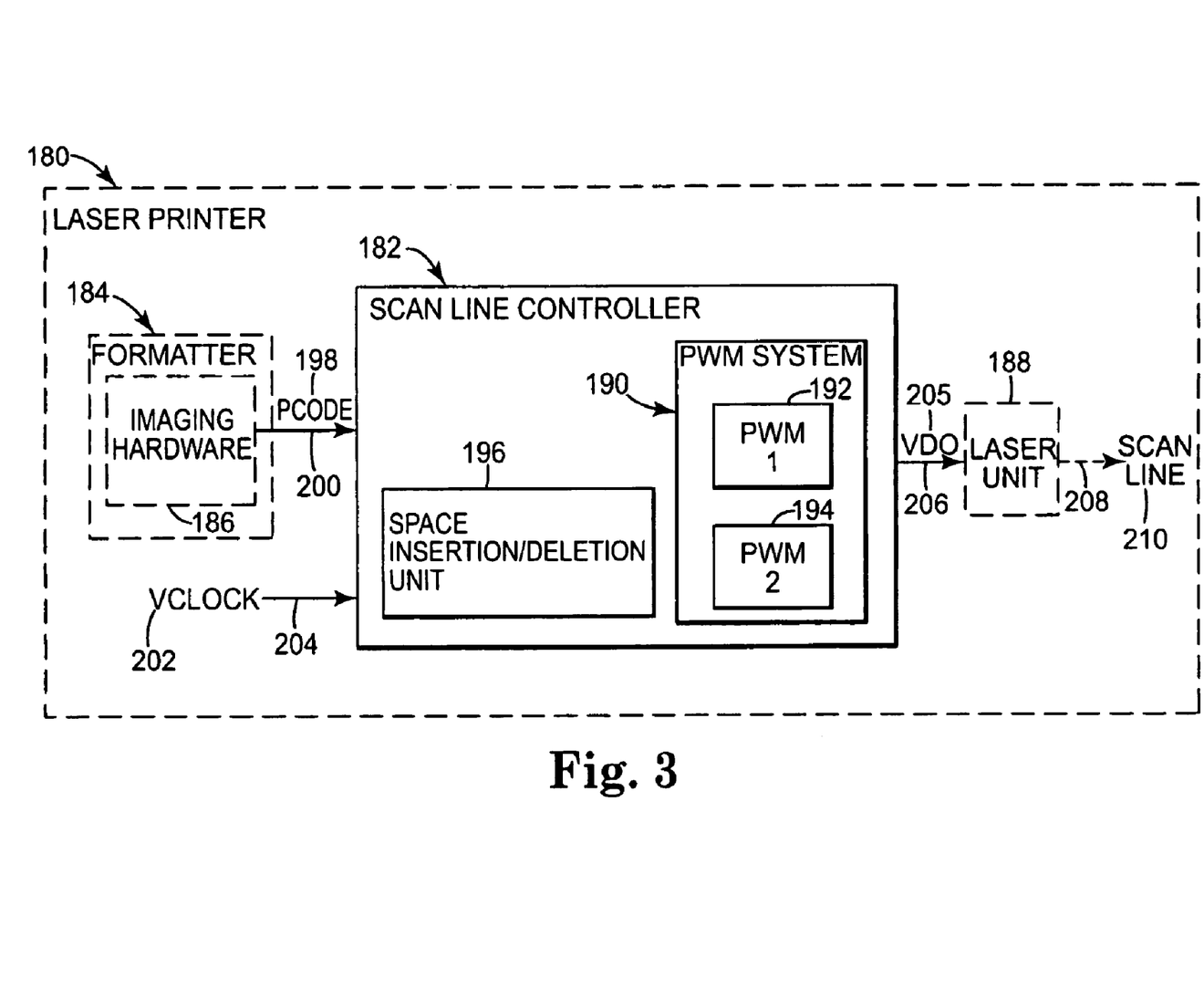
FIG. 3 is a block diagram of one exemplary embodiment of a laser printer.

FIG. 3 illustrates in block diagram form one exemplary embodiment of a laser printer 180. Laser printer 180 includes a scan line controller 182 capable of adjusting scan line lengths while reducing distortion, that might otherwise occur, in the output of a pulse width modulator (PWM) laser driver. Laser printer 180 further includes a formatter 184, including imaging hardware 186, and a laser unit 188. Scan line controller 182 further includes a pulse width modulator system 190, including a first PWM 192 and a second PWM 194, and a space insertion/deletion unit 196.

Scan line controller 182 is configured to receive a pulse code 198 via a path 200 and a video clock signal (VCLOCK) 202 via a path 204. First PWM 192 and second PWM 194 provide a first and a second modulated video signal, respectively, with each being representative of pulse code 198 and of video clock signal 202. PWM system 190 is further configured to select between the first and second modulated video signals to provide a modulated video driver signal (VDO) 205 via a path 206 to drive laser unit 188. Laser unit 188 converts VDO 205 to a laser beam at 208 to produce a scan line on print material as indicated at 210. Space insertion/deletion unit 196 is configured to selectively insert or delete one or more delays into first and second modulated video signals to adjust the scan line length.

Figure 4:
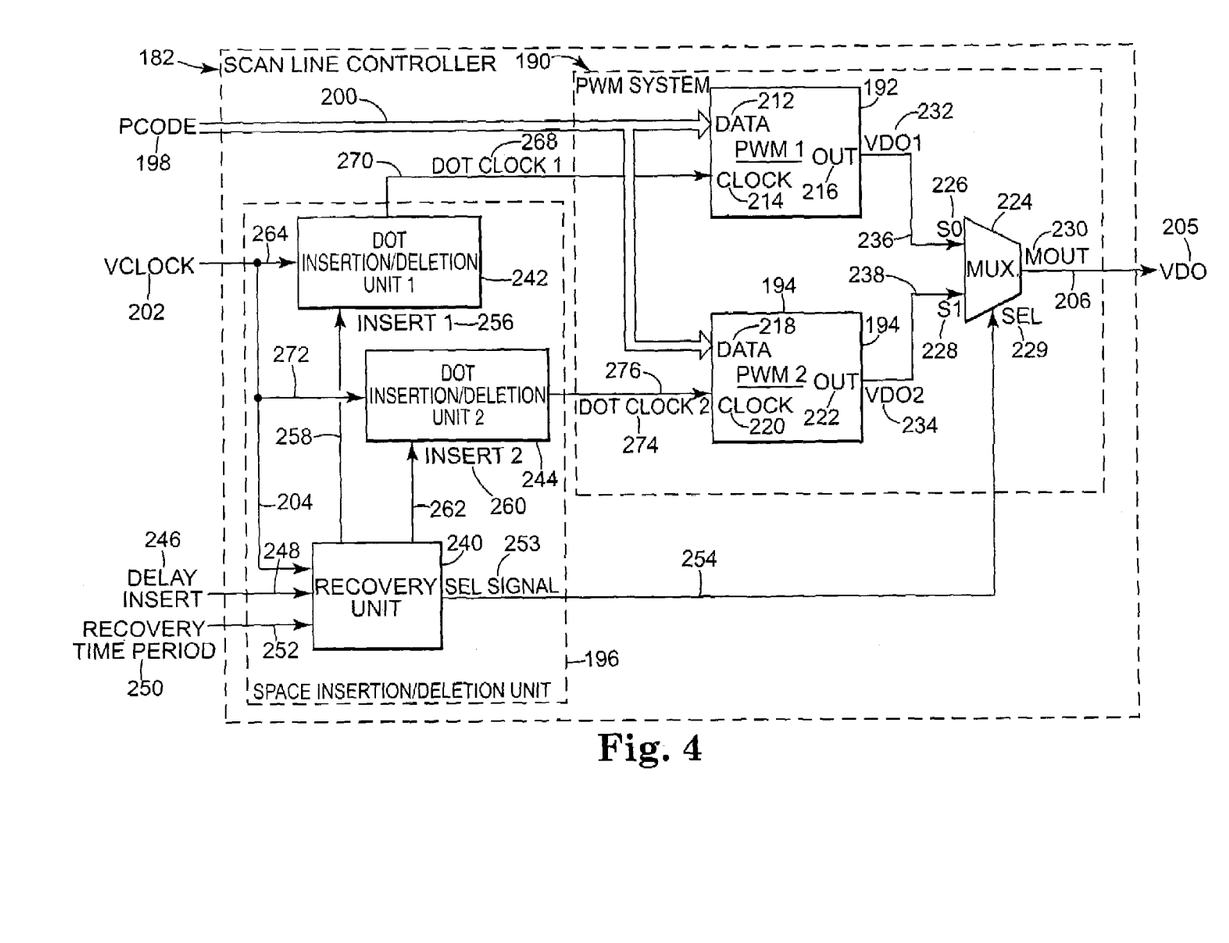
FIG. 4 is a block diagram of a scan line controller.

FIG. 4 is a block diagram illustrating in further detail one exemplary embodiment of scan line controller 182. Scan line controller 182 includes pulse width modulator system 190 and space insertion/deletion unit 196. PWM system 190 further includes: first PWM 192 having a data input 212, a clock input 214, and an output 216; second PWM 194 having a data input 218, a clock input 220, and an output 222; and a multiplexer 224 having a first input (S0) 226, a second input (S1) 228, a selector input (SEL) 229, and an output 230. First PWM 192 receives pulse code 198, comprising a series of coded pulses, at data input 212 via path 200, and converts pulse code 198 to a first modulated video signal (VDO1) 232 at output 216. Second PWM 194 receives pulse code 198 at data input 218, and converts pulse code 198 to a second modulated video signal (VDO2) 234 at output 222. Multiplexer 224 receives VDO1 232 at S0 226 via a path 236 and VDO2 234 at S1 228 via a path 238, and selects between S0 226 and S1 228 to provide VDO 205 at output 230.

Space insertion/deletion unit 196 includes a recovery unit 240, a first dot insertion/deletion unit 242, and a second dot insertion/deletion unit 244. Recovery unit 240 receives VCLOCK 202 via path 204, a delay insertion signal 246 via a path 248, and a recovery delay signal 250 via a path 252. Delay insertion signal 246 controls when space insertion/deletion unit 196 inserts a delay into modulated video drive signal 205. Recovery delay signal 250 instructs recovery unit 240 as to a recovery time for PWM1 192 and PWM2 194 to return to stable operation after a delay has been inserted into VDO1 232 and VDO2 234, respectively.

Recovery unit 240 provides a selector signal 253 via a path 254 to selector input 229 instructing multiplexer 224 to select between either VDO1 232 at first input S0 226 or VDO2 234 at S1 228. Recovery unit 240 provides a first insert signal 256 to first dot insertion/deletion unit 242 via a path 258 that instructs dot insertion/deletion unit 242 when to insert/delete a delay in VDO1 232, and provides a second insert signal 260 to second dot insertion/deletion unit 244 via a path 262 that instructs second insertion/deletion unit 244 when to insert/delete a delay in VDO2 234. First and second insert signals 256 and 260 can be generated in a variety of ways including, but not limited to, the use of a look-up table or a random number generator.

First dot insertion/deletion unit 242 receives VCLOCK 202 via a path 264 and provides a first dot clock 268 via a path 270 to clock input 214 of first PWM 192. Second dot insertion/deletion unit 244 receives VCLOCK 202 via a path 272 and provides a second dot clock 274 via a path 276 to clock input 220 of second PWM 194. First and second dot clocks 268 and 274 are signals that respectively instruct first PWM 192 and second PWM 194 when to receive the next coded pulse of PCODE 198 and to convert it into VDO1 232 and VDO2 234. Multiplexer 230 then receives VDO1 232 and VDO2 234 and provides VDO 205 to a laser unit, such as laser unit 188 of FIG. 3, for printing.

First and second dot clocks 268 and 274 trigger first PWM 192 and second PWM 194, respectively, to accept the next coded pulse of PCODE 198 at a predefined multiple of VCLOCK 202. For example, first and second dot clocks 268 and 274 may be configured to trigger first PWM 192 and second PWM 194 to accept the next coded pulse of PCODE 198 after every four cycles of VCLOCK 202. In other words, VCLOCK 202 has a frequency four times that of first and second dot clocks 268 and 274. When a delay is inserted into VDO 205, dot insertion/deletion units 242 and 244 may respectively delay first and second dot clocks 268 and 274 by an additional cycle of VCLOCK 202 so that first and second dot clocks 268 and 274 trigger first PWM 192 and second PWM 194 to receive the next coded pulse of PCODE 198 after five cycles of VCLOCK 202. In other words, the frequencies of first and second dot clocks 268 and 274 are decreased when a delay is added. When a delay is deleted from VDO 205, dot insertion/deletion units 242 and 244 delete one cycle of VCLOCK 202 from first and second dot clocks 268 and 274, respectively, so that they trigger first PWM 192 and second PWM 194 to receive the next coded pulse of PCODE 198 after three cycles of VCLOCK 202. In other words, the frequencies of first and second dot clocks are increased when a delay is deleted.

Figure 5:
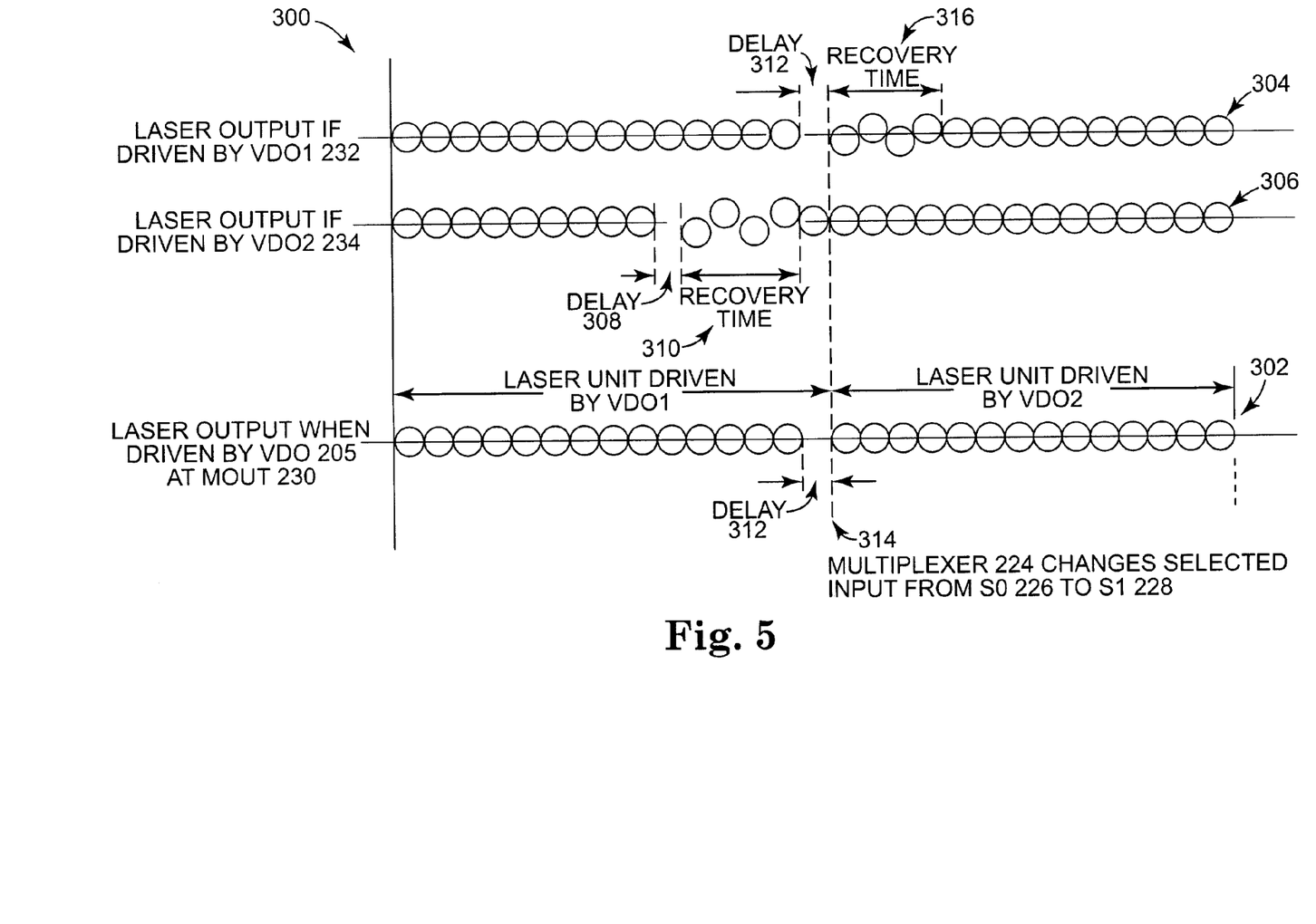
FIG. 5 is a timing diagram illustrating an example output dot pattern provided by a laser unit driven by a scan line controller.

FIG. 5 is a timing diagram 300 illustrating how an example output dot pattern 302 is produced by a laser unit, such as laser unit 188 of FIG. 3, driven by scan line controller 182 when a full dot width delay is inserted at single column in the scan line. To better illustrate the operation of scan line controller 182, the individual dots of dot patterns included as part of FIG. 5 are not shown as overlapping dots. Dot pattern 304 represents a dot pattern that would be produced if VDO1 232 of first PWM 192 was provided directly to laser unit 188. Dot pattern 306 represents a dot pattern that would be produced if VDO2 234 of second PWM 194 was provided directly to laser unit 188. Dot pattern 302 represents the dot pattern produced by laser unit 188 when receiving modulated video driver signal (VDO) 205 from multiplexer 224 via path 206.

Scan line controller 182 of FIG. 4 operates as follows to insert a delay into example output dot pattern 302 of FIG. 5. Initially, selector signal 253 instructs multiplexer 224 to select VDO1 232 at first input S0 226, and VDO1 232 is provided to a laser unit, such as laser unit 188, via path 206. Thus, laser unit 188 is initially driven by VDO1 232 and produces a dot pattern, indicated at 302, substantially matching that which would be produced from receiving VDO1 232 alone, as indicated at 304. Recovery unit 240 then receives delay insert signal 246 indicating that a one dot-width delay is to be inserted into output dot pattern 302, and receives a recovery delay signal 250 indicating that after insertion of a delay into first dot clock 268 and second dot clock 274, first PWM1 192 and second PWM2 194 take four cycles of their associated dot clocks to stabilize.

After receiving insert delay signal 246, recovery unit 240 provides second insert signal 260 to second dot insertion/deletion unit 244 instructing it to insert a one dot-width delay into second dot clock 274. Second dot insertion/deletion unit 244 inserts a one dot-width delay into second dot clock 274, which would produce in dot pattern 306 a one-dot width delay, as indicated at 308, and unstable output for four cycles of second dot clock 274, as indicated at 310, if VDO2 234 was provided to laser unit 188. After second PWM2 194 stabilizes, recovery unit 240 provides first insert signal to first dot insertion/deletion unit 242 instructing it to insert a one dot-width delay into first dot clock 268. First dot insertion/deletion unit 242 inserts a one dot-width delay in first dot clock 268, which produces a one dot width delay in both dot pattern 304 and in example output dot pattern 302, as indicated at 312 since multiplexer 224 has first input S0 226 as the selected input.

As soon as delay 312 has been inserted, recovery unit 240 provides a selector signal to multiplexer 224 instructing it to change its selected input from first input S0 226 to second input S1 228, to thereby provide VDO2 234 to laser unit 188 via path 206. Laser unit 188 is then driven by VDO2 234, as indicated at 314, and example dot pattern 302 receives stable output from second PWM2 194, and avoids the unstable output produced by first PWM1 192 during its four dot cycle recovery time as indicated at 316. By offsetting the insertion of delays into first and second dot clocks 268 and 274 and by having multiplexer 224 select as its input only the stable output from either first PWM1 192 or second PWM 194, scan line controller 182 maintains a stable video driver signal VDO 205 to laser driver 188 while inserting a delay 312 into example output dot pattern 302.

Scan line controller 182 can control scan line lengths of laser scanning devices employing pulse width modulator type laser drivers with substantially reduced distortion in the output dot patterns. By inserting or deleting delays alternately between the first and second pulse width modulators 192 and 194, and by multiplexer 224 selecting the stable output between the first and second modulated video signals, scan line controller 182 can adjust scan line lengths of the each of the four CYMK color planes with substantially reduced distortion. This characteristic allows for better alignment between the four CYMK color planes and can produce higher quality print images.

What is claimed is:

1. A laser imaging device comprising:
   a laser unit configured to form a scan line from a video driver signal; and
   a scan line controller comprising:
   a pulse width modulator system to receive a pulse code, the pulse width modulator system including a first pulse width modulator to receive a first dot clock having a first frequency and a second pulse width modulator to receive a second dot clock having the first frequency, and to provide the video driver signal to the laser unit; and
   a space insertion/deletion unit configured to adjust a scan line length by inserting or deleting one or more delays into the first and the second dot clocks, and wherein the pulse width modulator system further comprises a multiplexer configured to receive a selector signal instructing the multiplexer to select between a first video signal and a second video signal provided by the first and the second pulse width modulators, respectively, and with each representative of the pulse code, to thereby provide the video driver signal.

2. The laser imaging device of claim 1, wherein inserting or deleting a delay in the first dot clock inserts or deletes a delay in the first video signal, and inserting or deleting a delay in the second dot clock inserts or deletes a delay in the second video signal.

3. The laser imaging device of claim 1, wherein the space insertion/deletion unit includes a configuration to randomly delete or insert delays into the first and second dot clocks.

4. The laser imaging device of claim 1, wherein the space insertion/deletion unit includes a configuration to periodically delete or insert delays into the first and second dot clocks.

5. The laser imaging device of claim 1, wherein the scan line comprises a series of dots with each dot having a dot length.

6. The laser imaging device of claim 5, wherein each of the one or more delays inserted into the first and second dot clocks adjusts the length of the scan line by the dot length.

7. The laser imaging device of claim 5, wherein the each of the one or more delays inserted into the first and second dot clocks adjusts the length of the scan line by a fraction of the dot length.

8. A laser imaging device comprising:
a laser unit configured to form a scan line from a video driver signal; and
a scan line controller comprising:
a pulse width modulator system to receive a pulse code, the pulse width modulator system including a first pulse width modulator to receive a first dot clock and a second pulse width modulator to receive a second dot clock, and to provide the video driver signal to the laser unit; and
a space insertion/deletion unit configured to adjust a scan line length by inserting or deleting one or more delays into the first and the second dot clocks, wherein the insertion/deletion unit includes a configuration to insert or delete a first delay having a first delay time into the second dot clock and after a recovery time period to insert or delete a second delay having the first delay time into the first dot clock.

9. A laser imaging device comprising:
a laser unit configured to form a scan line from a video driver signal; and
a scan line controller comprising:
a pulse width modulator system to receive a pulse code, the pulse width modulator system including a first pulse width modulator to receive a first dot clock having a first frequency and a second pulse width modulator to receive a second dot clock having the first frequency, and to provide the video driver signal to the laser unit; and
a space insertion/deletion unit configured to adjust a scan line length by inserting or deleting one or more delays into the first and the second dot clocks, wherein a multiplexer configured to receive a selector signal instructing the multiplexer to select between a first video signal and a second video signal provided by the first and the second pulse width modulators, respectively, and with each representative of the pulse code, to thereby provide the video driver signal, wherein the scan line comprises a series of dots with each dot having a dot length, wherein the each of the one or more delays inserted into the first and second dot clocks adjusts the length of the scan line by a fraction of the dot length and wherein the pulse width modulator system includes a configuration to select the first video signal prior to the space insertion/deletion unit inserting the first delay into the second dot clock to and select the second modulated video signal after the space insertion/deletion unit inserts the second delay into the first dot clock.

10. A laser imaging device comprising:
a laser unit configured to form a scan line from a video driver signal; and
a scan line controller comprising:
a pulse width modulator system to receive a pulse code, the pulse width modulator system including a first pulse width modulator to receive a first dot clock having a first frequency and a second pulse width modulator to receive a second dot clock having the first frequency, and to provide the video driver signal to the laser unit; and
a space insertion/deletion unit configured to adjust a scan line length by inserting or deleting one or more delays into the first and the second dot clocks, and the pulse width modulator system comprising a multiplexer configured to receive a selector signal instructing the multiplexer to select between a first video signal and a second video signal provided by the first and the second pulse width modulators, respectively, and with each representative of the pulse code, to thereby provide the video driver signal, wherein the space insertion/deletion unit further comprises:
a first dot insertion/deletion unit configured to receive a system clock signal comprising a series of system clock pulses and to receive a first insert signal indicative of when a delay is to be inserted/deleted into the first dot clock, and configured to provide to the first pulse width modulator the first dot clock having one first dot clock pulse for every "n" system clock pulses, where "n" is an integer; and
a second dot insertion/deletion unit configured to receive the system clock signal and to receive a second insert signal indicative of when a delay is to be inserted/deleted into the second dot clock, and configured to provide to the second pulse width modulator the second dot clock having one second dot clock pulse for every "n" system clock pulses.

11. The laser imaging device of claim 10, wherein the first dot insertion/deletion unit increases the number of system clock pulses between consecutive first dot clock pulses by at least one system clock pulse to insert a delay in the first video signal to thereby increase the scan line length, and decreases the number of system clock pulses between consecutive first dot clock pulses by at least one system clock pulse to delete a delay from the first video signal to thereby decrease the scan line length.

12. The laser imaging device of claim 11, further comprising:
a recovery unit configured to receive a delay insertion signal indicative of whether the scan line length needs to be increased or decreased and to receive a recovery delay signal indicative of a recovery time period, and configured to provide the first insert signal to the first insertion/deletion unit, to provide the second insert signal to second insertion/deletion unit, and to provide the selector signal to the multiplexer.

13. The laser imaging device of claim 12, wherein the recovery unit instructs the multiplexer via the selector signal to select the first video signal prior to instructing the second insertion/deletion unit via the second insert signal to insert a delay into the second dot clock, and after the recovery time period has elapsed first instructs the first insertion/deletion unit via the first insert signal to insert a delay into the first dot clock and then instructs the multiplexer via the selector signal to select the second video signal to thereby provide the video driver signal.

14. The laser imaging device of claim 10, wherein the second dot insertion/deletion unit increases the number of system clock pulses between consecutive second dot clock pulses by at least one system clock pulse to insert a delay in the second video signal to thereby increase the scan line length, and decreases the number of system clock pulses between consecutive second dot clock pulses by at least one system clock pulse to delete a delay from the second video signal to thereby decrease the scan line length.

15. A scan line controller for use with a laser scanning device, comprising:
a pulse width modulator system to receive a pulse code, the pulse width modulator system including a first pulse width modulator to receive a first dot clock having a first frequency and a second pulse width modulator to receive a second dot clock having the first frequency, and to provide a video driver signal to a laser unit to provide a scan line from the video driver signal; and a space insertion/deletion unit configured to adjust a scan line length by inserting or deleting one or more delays into the first and the second dot clocks, wherein the pulse width modulator system further comprises:

a multiplexer configured to receive a selector signal instructing the multiplexer to select between a first video signal and a second video signal provided by the first and second pulse width modulators, respectively, and with each representative of the pulse code, to thereby provide the video driver signal.

16. The scan line controller of claim 15, wherein inserting or deleting a delay in the first dot clock inserts or deletes a delay in the first modulated video signal, and inserting or deleting a delay in the second dot clock inserts or deletes a delay in the second modulated video signal.

17. The scan line controller of claim 15, wherein the space insertion/deletion unit includes a configuration to randomly delete or insert delays into the first and second dot clocks.

18. The scan line controller of claim 15, wherein the space insertion/deletion unit includes a configuration to periodically delete or insert delays into the first and second dot clocks.

19. The scan line controller of claim 15, wherein the scan line comprises a series of dots with each dot having a dot length.

20. The scan line controller of claim 19, wherein each of the one or more delays inserted into the first and second dot clocks adjusts the length of the scan line by the dot length.

21. The scan line controller of claim 19, wherein the each of the one or more delays inserted into the first and second dot clocks adjusts the length of the scan line by a fraction of the dot length.

22. A scan line controller for use with a laser scanning device, comprising:

a pulse width modulator system to receive a pulse code, the pulse width modulator system including a first pulse width modulator to receive a first dot clock and a second pulse width modulator to receive a second dot clock, and to provide a video driver signal to a laser unit to provide a scan line from the video driver signal; and a space insertion/deletion unit configured to adjust a scan line length by inserting or deleting one or more delays into the first and the second dot clocks, wherein the insertion/deletion unit includes a configuration to insert or delete a first delay having a first delay time into the second dot clock and after a recovery time period to insert or delete a second delay having the first delay time into the first dot clock.

23. A scan line controller for use with a laser scanning device, comprising:

a pulse width modulator system to receive a pulse code, the pulse width modulator system including a first pulse width modulator to receive a first dot clock having a first frequency and a second pulse width modulator to receive a second dot clock having the first frequency, and to provide a video driver signal to a laser unit to provide a scan line from the video driver signal; and a space insertion/deletion unit configured to adjust a scan line length by inserting or deleting one or more delays into the first and the second dot clocks, wherein the scan line comprises a series of dots with each dot having a dot length, wherein the each of the one or more delays inserted into the first and second dot clocks adjusts the length of the scan line by a fraction of the dot length, and wherein the pulse width modulator system includes a configuration to select the first modulated video signal prior to the space insertion/deletion unit inserting the first delay into the second dot clock and to select the second modulated video signal after the space insertion/deletion unit inserts the second delay into the first dot clock.

24. A scan line controller for use with a laser scanning device, comprising:

a pulse width modulator system to receive a pulse code, the pulse width modulator system including a first pulse width modulator to receive a first dot clock having a first frequency and a second pulse width modulator to receive a second dot clock having the first frequency, and to provide a video driver signal to a laser unit to provide a scan line from the video driver signal; and a space insertion/deletion unit configured to adjust a scan line length by inserting or deleting one or more delays into the first and the second dot clocks, and wherein the pulse width modulator comprises:

a multiplexer configured to receive a selector signal instructing the multiplexer to select between a first video signal and a second video signal provided by the first and second pulse width modulators, respectively, and with each representative of the pulse code, to thereby provide the video driver signal, wherein the space insertion/deletion unit further comprises:

a first dot insertion/deletion unit configured to receive a system clock signal comprising a series of system clock pulses and to receive a first insert signal indicative of when a delay is to be inserted/deleted into the first dot clock, and configured to provide to the first pulse width modulator the first dot clock having one first dot clock pulse for every "n" system clock pulses, where "n" is an integer; and a second dot insertion/deletion unit configured to receive the system clock signal and to receive a second insert signal indicative of when a delay is to be inserted/ deleted into the second dot clock, and configured to provide to the second pulse width modulator the second dot clock having one second dot clock pulse for every "n" system clock pulses.

25. The scan line controller of claim 24, wherein the first dot insertion/deletion unit increases the number of system clock pulses between consecutive first dot clock pulses by at least one system clock pulse to insert a delay in the first video signal to thereby increase the scan line length, and decreases the number of system clock pulses between consecutive first dot clock pulses by at least one system clock pulse to delete a delay from the first video signal to thereby decrease the scan line length.

26. The scan line controller of claim 25, further comprising:

a recovery unit configured to receive a delay insertion signal indicative of whether the scan line length needs to be increased or decreased and to receive a recovery delay signal indicative of a recovery time period, and configured to provide the first insert signal to the first insertion/deletion unit, to provide the second insert signal to second insertion/deletion unit, and to provide the selector signal to the multiplexer.

27. The scan line controller of claim 26, wherein the recovery unit instructs the multiplexer via the selector signal to select the first video signal prior to instructing the second insertion/deletion unit via the second insert signal to insert a delay into the second dot clock, and after the recovery time period has elapsed first instructs the first insertion/deletion unit via the first insert signal to insert a delay into the first dot clock and then instructs the multiplexer via the selector signal to select the second video signal to thereby provide the video driver signal.

28. The scan line controller of claim 24, wherein the second dot insertion/deletion unit increases the number of system clock pulses between consecutive second dot clock pulses by at least one system clock pulse to insert a delay in the second video signal to thereby increase the scan line length, and decreases the number of system clock pulses between consecutive second dot clock pulses by at least one system clock pulse to delete a delay from the second video signal to thereby decrease the scan line length.

29. A method for adjusting scan line length in a laser scanning device, comprising:
producing a scan line from a video driver signal with a laser unit;
producing the video driver signal from a pulse code with a pulse width modulator system having a first pulse width modulator operating based on a first clock signal having a first clock frequency and a second pulse width modulator operating based on a second clock signal having the first clock frequency;
adjusting the scan line length by inserting or deleting one or more delays into the first and second clock signals; and selecting between a first video signal provided by the first pulse width modulator and a second video signal provided by the second pulse width modulator with a multiplexer to provide the video driver signal.

30. A method for adjusting scan line length in a laser scanning device, comprising:
producing a scan line from a video driver signal with a laser unit;
producing the video driver signal from a pulse code with a pulse width modulator system having a first pulse width modulator operating at a first clock frequency and a second pulse width modulator operating at a second clock frequency;
adjusting the operating frequencies of the first and second pulse width modulators by inserting or deleting one or more delays into the first and second clock frequencies, respectively;
selecting between a first video signal provided by the first pulse width modulator and a second video signal provided by the second pulse width modulator with a multiplexer to provide the video driver signal;
selecting the first video signal prior to inserting or deleting a first delay having a first time period into the second clock frequency;
inserting or deleting a second delay having the first time period into the first clock frequency following a recovery period; and
selecting the second video signal thereby providing the video driver signal.

31. The method of adjusting scan line length of claim 30 comprising:
producing a scan line comprising a series of dots with each dot having a dot length.

32. The method of adjusting scan line length of claim 31 comprising:
inserting or deleting one or more delays into the first and second clock frequencies wherein each delay adjusts the scan line length by the dot length.

33. The method of adjusting scan line length of claim 31 comprising:
inserting or deleting one or more delays into the first and second clock frequencies wherein each delay adjusts the scan line length by a fraction of the dot length.

34. The method of adjusting scan line length of claim 30 comprising:
inserting or deleting periodically one or more delays into the first and second clock frequencies.

35. The method of adjusting scan line length of claim 30 comprising:
inserting or deleting randomly one or more delays into the first and second clock frequencies.

36. A method of adjusting scan line length in a laser scanning device, comprising:
providing a first video data signal and a second video data signal;
supplying a laser unit with the second video data signal while inserting or deleting a delay having a first duration into the first video data signal and during a recovery period of the first video data signal associated with the inserting or deleting of the delay into the first video data signal;
supplying the laser unit with the first video signal while inserting or delaying a delay having a delay substantially equal to the first duration into the second video data signal and during a recovery period of the second video data signal associated with the inserting or deleting of the delay into the second video data signal.

37. The method of adjusting scan line length of claim 36, further comprising:
selecting between the first and second video data signals with a multiplexer to thereby supply the first or second video data signal to the later unit.

38. The method of adjusting scan line length of claim 37, further comprising:
adjusting the operating frequencies of the first and second pulse width modulators by inserting or deleting one or more delays into the first and second clock frequencies.

39. The method of adjusting scan line length of claim 38, further comprising:
producing a scan line comprising a series of dots with each dot having a dot length.

40. The method of adjusting scan line length of claim 39, further comprising:
inserting or deleting one or more delays into the first and second clock frequencies wherein each delay adjusts the scan line length by the dot length.

41. The method of adjusting scan line length of claim 39, further comprising:
inserting or deleting one or more delays into the first and second clock frequencies wherein each delay adjusts the scan line length by a fraction of the dot length.

42. The method of adjusting scan line length of claim 38, further comprising:
inserting or deleting periodically one or more delays into the first and second clock frequencies.

43. The method of adjusting scan line length of claim 38, further comprising:
inserting or deleting randomly one or more delays into the first and second clock frequencies.

44. The method of adjusting scan line length of claim 36, further comprising:
producing the first video data signal from a pulse code with a first pulse width modulator operating at a first clock frequency; and
producing the second video data signal from the pulse code with a second pulse width modulator operating at a second clock frequency.

45. A laser imaging device comprising:

means for forming a scan line from a video driver signal; and means for controlling a scan line length comprising:

means for receiving a pulse code and a first dot clock having a first frequency and providing a first video signal based on the pulse code and the first dot clock;

means for receiving the pulse code and a second dot clock having the first frequency and providing a second video signal based on the pulse code and the second dot clock;

means for selecting between the first video signal and the second video signal to provide the video driver signal, including a multiplexer configured to receive a selector signal; and means for inserting or deleting one or more delays into the first and second dot clocks to adjust the scan line length.

46. The laser imaging device of claim 45, further comprising:

a means to randomly insert or delete delays into the first and second dot clocks.

47. The laser imaging device of claim 45, further comprising:

a means to periodically insert or delete delays into the first and second dot clocks.

48. The laser imaging device of claim 45, further comprising:

a means for forming a scan line comprising a series of dots with each dot having a dot length.

49. The laser imaging device of claim 48, further comprising:

a means for inserting one or more delays into the first and second dot clocks wherein each of the delays adjusts the scan line length by the dot length.

50. The laser imaging device of claim 48, further comprising:

a means for inserting one or more delays into the first and second dot clocks wherein each of the delays adjusts the scan line length by a fraction of the dot length.

51. A laser imaging device comprising:

means for forming a scan line from a video driver signal;

means for controlling a scan line length comprising:

means for receiving a pulse code and a first dot clock and providing a first video signal;

means for receiving the pulse code and a second dot clock and providing a second video signal;

means for selecting between the first video signal and the second video signal to thereby provide the video driver signal; and means for inserting or deleting one or more delays into the first and second dot clocks to thereby adjust the scan line length;

a means for selecting the second video signal while inserting or deleting a delay into the first dot clock and during a recovery period of the first video signal associated with the inserting or deleting of the delay into the first dot clock; and a means for selecting the first video signal while inserting or deleting the delay into the second dot clock and during a recovery period of the second video signal associated with the inserting or deleting of the delay into the second dot clock.

* * * * *